United States Patent [19]

Murakami et al.

[11] 3,949,028

[45] Apr. 6, 1976

[54] METHOD OF MAKING CELLULAR POLYMERIC SHAPED ARTICLES HAVING RELIEF PATTERNS

[75] Inventors: Shinji Murakami, Kyoto; Kazuo Okuse, Uji, both of Japan

[73] Assignee: Eiwa Chemical Industrial Co., Ltd., Tokyo, Japan

[22] Filed: Oct. 23, 1974

[21] Appl. No.: 517,314

[52] U.S. Cl. .................. 264/22; 264/52; 264/134; 427/12; 428/178
[51] Int. Cl.² .......................................... B29D 27/00
[58] Field of Search ................ 264/52, 54, 134, 22

[56] References Cited
UNITED STATES PATENTS

| | | | |
|---|---|---|---|
| 3,836,624 | 9/1964 | Ferris............................ | 264/52 X |
| 3,864,143 | 2/1975 | Fantazier et al................ | 264/54 X |

*Primary Examiner*—Philip Anderson
*Attorney, Agent, or Firm*—Armstrong, Nikaido & Wegner

[57] ABSTRACT

A method of making cellular or expanded polymeric shaped articles having relief patterns which comprises forming a thermoplastic polymer composition containing azodicarbonamide as a chemical blowing agent into a desired shape, irradiating a surface of the shaped body thus obtained with light of wave lengths of 100 to 500 m$\mu$ through a printed pattern applied thereto or a screen which locally shades light rays, such as a stencil or a positive or negative transparency, superposed thereon and heating the shaped body to effect foaming or expansion thereof.

6 Claims, No Drawings

METHOD OF MAKING CELLULAR POLYMERIC SHAPED ARTICLES HAVING RELIEF PATTERNS

This invention relates to a method of making foamed or cellular polymeric bodies having a relief pattern on their surfaces. More particularly, the present invention relates to a method of making cellular polymeric articles containing azodicarbonamide incorporated as a chemical blowing agent in the polymer. The relief pattern is formed on the surface of the polymeric body by specifically irradiating areas on the surface of the polymeric body with light rays consisting essentially of ultraviolet rays to decompose the azodicarbonamide in the irradiated areas, followed by heating to expand the body in non-irradiated areas.

According to the prior art it is known that a relief pattern can be formed thermally or mechanically on the surface of an expanded or cellular polymeric article by means of an embossing roller. This method, however, has the disadvantage that polymeric articles that have been expanded must be subjected to further fabrication. Further, it is difficult to obtain a relief pattern or embossment conforming to a printed pattern.

Recently there has been developed a so-called chemical embossing method for solving the aforesaid problems in thermal or mechanical embossing processes to obtain an embossment derived from a printed pattern, as disclosed in Japanese Patent Publication Nos. 15713/1968 and 28636/1968 and British Patent No. 1,171,177. In these methods, a relief pattern derived from a printed pattern is obtained by printing a pattern on the surface of a thermoplastic resinous sheet which incorporates therein a chemical blowing agent along with a printing ink containing a substance which promotes or inhibits decomposition of the blowing agent. Alternately, a thermoplastic resinous sheet is prepared incorporating therein both a chemical blowing agent and a substance which promotes or inhibits decomposition of the blowing agent and printing thereon a pattern with a printing ink containing a substance which suppresses the effect of the aforesaid substance capable of promoting or inhibiting decomposition of the blowing agent contained in the sheet. The expandable thermoplastic resinous sheet is then heated to effect expansion thereof in different degrees between the printed areas and the unprinted areas.

These chemical embossing methods also have many shortcomings, however. Specifically, in this method which takes advantage of the fact that the presence of a printing ink effects the decomposition temperature of a blowing agent, and therefore it is necessary to incorporate in a printing ink such a substance as mentioned above as well as a substance which aids penetration of the aforesaid substance into a resinous layer. Therefore, no commercially available printing ink can be used and it is necessary to employ a specially formulated printing ink. When a blowing agent-incorporated polymeric sheet is printed with such a specially formulated printing ink, it is necessary to use a vehicle having a sufficient partition ratio and a long period of time is necessary for sufficient migration of the substance into the sheet in order to obtain sufficient contact between such substances and a blowing agent to ensure that the promoting or inhibiting decomposition of the blowing agent. Although is is not difficult in the case of polymer compositions which incorporate therein a large proportion of a plasticizer, it is very difficult to obtain sufficient contact between a blowing agent and a promoter or retarder in case of unplasticized polymers, such as polyethylene, polypropylene, polyvinyl acetate or natural or snythetic rubber, since in these polymer compositions particles of a blowing agent are fully enclosed by a polymeric matrix. In addition, in this method it is necessary to control closely the processing temperature and time to bring about a sufficient difference in decomposition temperature of the blowing agent by the action of a promoter or inhibitor and to bring the polymer composition into an appropriate thermoplastic state. Moreover, in this method, portion of the chemical blowing agent remains undecomposed and the remaining blowing agent decreases the commercial value of the product since most of the commercially available chemical blowing agents are colored, e.g., azodicarbonamide which is most frequently used for vinyl leather is yellow in color.

Accordingly, an object of the present invention is to provide an improved method of producing cellular or expanded polymeric shaped articles having relief patterns.

Another object of the present invention is to provide an improved method of producing cellular polymeric shaped articles without using any decomposition inhibitor for a chemical blowing agent.

According to the method of the present invention, a cellular polymeric shaped article having a relief pattern is produced by forming a polymer composition containing azodicarbonamide as a chemical blowing agent into a desired shape, specifically irradiating areas on the surface of the shaped body with light of wave lengths of 100 to 500 m$\mu$ and then thermally expanding the shaped body to cause expansion of the non-irradiated areas. The irradiation of the shaped body is carried out by applying a printed pattern on to the surface thereof or superposing a screen or other shading member on the surface and irradiating the shaped body over the printed pattern or screen or shading member.

The primary characteristic feature of the present invention is that, unlike the prior methods in which the decomposition temperature or time is slightly varied by means of a promotor or retarder, azodicarbonamide is subjected to the action of "light" which is significantly different from the means utilized in the prior methods to decompose the aziodicarbonamide into inactive state in the irradiated area. According to the prior art, although differences in decomposition temperature are caused by the action of a promotor or retarder, the difference in decomposition temperature are not sufficient in cases where polyvinyl chloride compositions are employed because of the stabilizer incorporated therein which activates the blowing agent. Further the difference is even more reduced by the premature decomposition of the blowing agent that takes place at temperatures below the decomposition temperature. In accordance with the method of the present invention, however, a blowing agent is decomposed by irridation with light. Thus, the blowing agent is decomposed into a compound having a decomposition temperature far apart from that of the original blowing agent which is stable at temperatures within the usually adopted range or, even if decomposed slightly, does not yield gases. Accordingly, it is unnecessary to carefully choose the narrow processing conditions as in the prior methods using a promotor or retarder in order to obtain an expanded or cellular product of a good quality merely by putting an expandable body after irradiation under conditions which cause expansion.

The second characteristic feature of the present invention is that there may be used any commercially available printing ink for printing on an expandable shaped body differing from the prior methods which need a specially formulated ink. In addition, in accordance with the present invention, surprisingly it is possible to form a relief pattern having varying heights by varying the color and amount of ink and additives applied to form a printed pattern different in photo absorption from portion to portion.

The third characteristic feature of the present invention is that the local irradiation of the surface of an expandable shaped body can be attained not only by means of the printing but by means of a negative or positive transparency or screen such as employed at present in photography or phototype process. In the latter case, an expanded product having on its surface a relief pattern corresponding to a pattern or image on the transparency or screen is obtained by superposing the transparency or screen on an expandable body and irradiating the expandable body through the transparency or screen with light and then heating the irradiated expandable body.

The fourth characteristic feature of the present invention is that the method of the present invention can be applied to a variety of polymer compositions as well as polyvinyl chloride composition, including those to which the prior methods are unsuitable, such as polyethylene, polypropylene, polyvinyl acetate, acrylonitrile-butadiene-styrene resin, and the like without any restriction in the sort of composition of resin so long as the resinous composition can be combined with a chemical blowing agent and expanded into a cellular body, since according to the present invention there is no problem of contact between a promotor or retarder with a chemical blowing agent and migration of the promotor or retarder with time lapse.

The fifth characteristic feature of the present invention is that while the prior art requires the selection of appropriate decomposition promotors or retarders and correspondingly adjustment of the other ingredients to properly control the viscosity of the composition upon expansion, in the method of the present invention there is no such requirement and various compositions may be used, which make it possible to select the most effective composition for, e.g., low temperature processing or high temperature and short time processing conditions.

The sixth characteristic feature of the present invention is that the present method is adaptable also to shaped bodies other than sheets. For example, even a non-sheet-like body can be easily converted into an expanded product having a relief pattern as long as it can be irradiated with light.

The chemical blowing agent used in the method of the present invention is azodicarbonamide which is easily decomposed by the action of light to yield large amounts of gases. The azodicarbonamide is used in an amount usually of 0.2 to 20 parts by weight, preferably of 0.5 to 15 parts by weight per 100 parts by weight of polymer.

In the method of the present invention there may be used any thermoplastic polymer capable of being combined with azodicarbonamide and forming a cellular body, such as, e.g., polyethylene, polypropylene, polyvinyl acetate, ethylene-vinyl acetate copolymer, ethylene-alkyl acrylate copolymers, polyvinyl chloride, vinyl chloride-vinyl acetate copolymer, polyvinyl alcohol, polystyrene, and acrylonitrile-butadiene-styrene resin.

The light rays suitably used in the method of the present invention are those containing rays of wave lengths capable of decomposing the aforesaid azodicarbonamide, though preferred are light rays of the wave length range including the ultraviolet region, i.e., of wave lengths of 100 to 500 m$\mu$. The source of light emitting such light rays includes sunlight, low pressure, high pressure and very high pressure mercury lamps, xenon lamp and carbon arc lamp, though most preferred are low pressure and high pressure mercury lamps emitting effective light rays of wave lengths of 200 to 400 m$\mu$. The extent of irradiation varies depending on the distance from a light source to an object, the intensity of light, the amount of a blowing agent, the kind of a resin used and other factors, and is carried out in usually for 1 to 60 minutes, preferably for 3 to 15 minutes.

In the composition of this invention comprising a polymer and a chemical blowing agent there may be incorporated any of the conventional additives usually incorporated in a polymer composition for making expanded bodies provided they do not inhibit transmission of ultraviolet rays through the composition. Examples of such additives are loading fillers, plasticizers, solvents, diluents, extenders, pigments, curing agents, crosslinking agents, vulcanizers, stabilizers, and foaming agent aids, such as urea, zinc oxide and metal salts of stearic acid. In addition, in the practice of the present invention there may be employed an optical sensitizer for enhancing efficiency of light rays and shortening the time for decomposition of the blowing agent.

The expandable polymer composition thus obtained is formed into a desired shape, printed with a desired pattern on its surface or covered by a film or screen having a desired pattern, irradiated with light and heated to obtain a cellular polymeric shaped body having a relief pattern on its surface.

The heating temperature and time after irradiation of the expandable composition vary depending on the chemical blowing agent and polymer employed, however, it is necessary to heat the expandable body at a temperature and for a time sufficient to cause decomposition of the blowing agent to yield a sufficiently great volume of gases. For instance, azodicarbonamide is heated at 180 to 220 degrees C for about 1 to about 10 minutes.

In the following Examples all parts are by weight unless otherwise indicated.

EXAMPLE I

| | |
|---|---|
| Polyvinyl chloride (mw 1,300, emulsion polymerized) | 100 parts |
| Dioctyl phtalate | 80 parts |
| Azodicarbonamide | 3 parts |
| Stabilizer (Ca-Zn complex salt) | 3 parts |

A polyvinyl chloride paste was prepared in the above proportions, and the paste was applied to a cloth or releasing paper and heated at 100°C for 2 minutes to effect partial gelation. Thus there was obtained a 0.5 mm thick sheet. A pattern was printed on the sheet with a commercially available printing ink and the sheet was irradiated for 7 minutes by means of a 75 watt ultraviolet irradiator located 5 cm apart from the sheet. The azodicarbonamide contained in the sheet was not decomposed at all in the printed areas but was decomposed in the other irradiated areas. The sheet was then heated in an oven at 200°C for 2 minutes to effect expansion thereof. Thus, there was obtained an embossed expanded sheet of which the thickness in printed area was 1.3 mm while that in the other areas was 0.75 mm.

The average molecular weight (mw) of the polyvinyl chloride used was as determined in accordance with Japanese Industrial Standard by a non-viscometric method.

EXAMPLE II

| | |
|---|---|
| Polyvinyl chloride (mw 1,100, suspension) | 100 parts |
| Dioctyl phthalate | 80 parts |
| Azodicarbonamide | 3 parts |
| Stabilizer (Cd-Ba complex salt) | 2 parts |

The compound of the above recipe was calendered in a conventional manner into a 0.3 mm thick sheet. The sheet was covered with a patterned screen and irradiated for 6 minutes 30 seconds by means of a 2 KW ultraviolet irradiator located 15 cm apart from the sheet. The azodicarbonamide contained in the sheet thus obtained was not decomposed at all in the covered areas but was decomposed in the other areas. The sheet was then heated in an oven at 190°C for 2 minutes to effect expansion. The thickness of the expanded sheet thus obtained was 0.87 mm in shaded areas and 0.35 mm in the other areas.

The average molecular weight of the polyvinyl chloride used was determined in the same method as in Example I.

EXAMPLE III

A dry blend of 100 parts of an acrylonitrilebutadiene-styrene resin, supplied by Asahi-Dow Co., Ltd., under a trade name "Stylac", and 5 parts of azodicarbonamide was extruded by means of an extruder at 200°C into a 3 mm thick sheet. A pattern was printed on the surface of the sheet with a commercially available printing ink and the sheet was irradiated for 2 minutes by means of a 75 wt ultraviolet irradiator located 5 cm apart from the sheet. The extent of decomposition of the blowing agent contained in the sheet thus irradiated was the same with that in Example I. The sheet was then heated in an oven at 250°C for 7 minutes to effect expansion. Thus there was obtained an embossed sheet of a good quality having a thickness of 4.2 mm in printed areas and 3.2 mm in the other areas.

EXAMPLE IV

| | |
|---|---|
| Low density polyethylene (M. I. 4) | 100 parts |
| Dicumyl peroxide | 1 part |
| Azodicarbonamide | 10 parts |

A blend having the above composition was kneaded thoroughly on a mixing roll at a temperature of 100° to 110°C and calendered into a 1 mm thick sheet. The sheet was covered with a patterned screen and irradiated for 8 minutes 15 seconds by means of a 1 KW ultraviolet irradiator located 10 cm apart from the sheet. The azodicarbonamide contained in the sheet thus obtained was not decomposed at all in the covered areas but was decomposed in the other areas. The sheet was then soaked in a salt bath heated at 220°C for 1 minute 30 seconds to effect expansion. The thickness of the expanded sheet thus obtained was 2.7 mm in shaded areas and 1.2 mm in the other areas.

EXAMPLE V

| | |
|---|---|
| Ethylene-vinyl acetate copolymer (VAc content 16%, M. I. 2) | 100 parts |
| Dicumyl peroxide | 1 part |
| Azodicarbonamide | 8 parts |

The compound of the above composition was thoroughly kneaded on a mixing roll and formed into a 5 mm thick sheet. The sheet was printed with a pattern hsing a commercially available printing ink and irradiated for 8 minutes by means of a 75 watts ultraviolet irradiator located 5 cm apart therefrom. The degree of decomposition of the blowing agent contained in the irradiated sheet was the same with that in Example 1. The sheet was then heated in an oven at 210°C for 4 minutes to obtain a foamed sheet of a thickness of 8.5 mm in patterned areas and 5.2 mm in the other areas having a good embossment.

We claim:

1. A method of making cellular polymeric shaped articles having a relief pattern on their surfaces comprising forming thermoplastic polymer composition containing 0.2 to 20 parts by weight of azodicarbonamide per 100 parts by weight of the polymer into a desired shape, printing a pattern on the surface of the shaped body, irradiating the printed shaped body with light rays of wave lengths 100 to 500 m$\mu$ for 1 to 60 minutes and heating the irradiated body to effect expansion of the composition in the non-irradiated areas.

2. A method of claim 1 in which the irradiated shaped body is heated to a temperature above the decomposition temperature of the azodicarbonamide contained.

3. A method of claim 1 in which the light is of wave lengths of 200 to 400 m$\mu$.

4. A method of claim 1 in which the polymer is polyvinyl chloride.

5. A method of claim 1 in which the polymer is polyethylene.

6. A method of claim 1 in which the polymer is an ethylene-vinyl acetate copolymer.

* * * * *